United States Patent
Ryan et al.

[15] 3,671,809
[45] June 20, 1972

[54] GROUND FAULT DETECTOR INCLUDING MAGNETIC AMPLIFIER BRIDGE MEANS

[72] Inventors: John T. Ryan, Hyde Park; Jeffrey D. Ingalls, Lynn, both of Mass.

[73] Assignee: GTE Sylvania Incorporated

[22] Filed: Nov. 1, 1971

[21] Appl. No.: 194,391

[52] U.S. Cl. ........................ 317/18 D, 317/27 R, 323/75 S, 324/51, 340/255, 340/253 H
[51] Int. Cl. ........................................................ H02h 3/16
[58] Field of Search ............. 317/18 D, 27 R; 323/75 S, 75 B; 324/98, 51; 340/255, 253 H, 253 Q

[56] References Cited

UNITED STATES PATENTS

| | | | |
|---|---|---|---|
| 2,832,916 | 4/1958 | Kennedy | 317/51 |
| 2,700,125 | 1/1955 | King | 317/18 D |
| 2,640,967 | 6/1953 | MacGeorge | 323/75 S |

Primary Examiner—J. D. Miller
Assistant Examiner—Harvey Fendelman
Attorney—Norman J. O'Malley et al.

[57] ABSTRACT

A protective device for detecting abnormal leakage current to ground in an electrical circuit energized through two or more conductors connected to an AC source, one of the conductors being grounded at the source. The device comprises a magnetic amplifier having a pair of reactor cores upon which a plurality of gate windings are arranged to form a balanced inductance bridge. An oscillator is connected across the bridge to apply a carrier signal at a frequency many times higher than the frequency of the AC source, and the bridge output is connected through a peak detector and amplifier to drive the solenoid of a circuit breaker. Each supply line conductor of the monitored circuit is wound about both the reactor cores with the sense of each windings being arranged to provide a net magnetic flux of zero when equal currents are flowing through each conductor. In this manner the magnetic amplifier provides at the bridge output a null signal during normal current conditions and an error signal voltage in the presence of a current imbalance between the conductors.

13 Claims, 2 Drawing Figures

PATENTED JUN 20 1972　　　　　　　　　　　　　　3,671,809

GROUND FAULT DETECTOR INCLUDING MAGNETIC AMPLIFIER BRIDGE MEANS

BACKGROUND OF THE INVENTION

This invention relates to condition-sensing systems and, in particular, to a circuit for detecting a current imbalance between a plurality of electrical conductors. The invention has particular utility as a ground fault detector for providing protection from electrical shock in low voltage utilization circuits in homes and commercial and industrial installations.

The most commonly employed circuit protection devices presently in use are the standard fuse and the conventional 15 ampere circuit breaker. Although being quite practical and satisfactory for providing overload and short circuit protection, however, fuses and circuit breakers will not provide protection against line-to-ground short circuits when the resulting current flow is less than the rated capacity of the breaker. Such an abnormal leakage current to ground may result from a breakdown in insulation or by the accidental flow of current through a person's body. In view of the potential hazards from electrical shock and fire, therefore, a great need exists for a practical, relatively low cost means for detecting when an abnormal current is flowing from line-to-ground and for immediately deenergizing the circuit upon sensing such a ground fault.

A number of ground fault detection systems have been proposed to meet this need; typical examples are those described in U.S. Pat. No. 3,213,321 and No. 3,555,359. Most of these prior art systems employ a differential transformer to monitor the current flow in the conductors of a power supply circuit and detect any current imbalance due to the abnormal flow of leakage current to ground. The transformer generally has a toroidal core, with the power supply conductors passing through the core as balanced primary windings, and a secondary winding provides a differential error signal voltage in response to a current imbalance between the primaries. A trip circuit then amplifies the error signal for application directly, or through an intermediate switch, to actuate a circuit breaker. To provide the degree of protection presently desired, such ground fault interrupters are designed to switch off 120 volt AC power in milliseconds when ground leakage currents as low as 5 milliamps are detected.

The typical differential transformer, however, provides a very small error signal voltage, approximately in the range of 50 millivolts. Such an error voltage level must be amplified many hundred times just to provide a power level sufficient for switching a triac or silicon controlled rectifier. Further, since the error signal voltage generally represents a very small current imbalance due to ground leakage, e.g., approximately a 5 milliampere deviation in the 15 ampere main current, the null or zero error voltage must be made extremely small compared to an output voltage of 50 millivolts. Hence, extreme care must be taken in the construction of the device, or a very sharply tuned filter must be used before the amplifier. Obviously, such a system is relatively prone to false triggering in response to transient voltages.

In order to provide a larger error signal voltage and avoid the need for amplification, a special differential transformer must be employed with a large number of primary windings. In practice, however, this is a very expensive approach, since the primary winding generally must consist of the 30 ampere line and neutral leads wound in bifilar fashion. Obviously, this is very bulky. In addition, the winding must be very uniform to achieve balancing of the magnetic flux in the absence of a fault current. Finally, the transformer core must have a large cross-sectional area and a very high permeability in order to achieve the necessary inductance in the primary, which must have a low number of turns. Clearly, the size and expense of a transformer meeting these conditions make it somewhat impractical for general use in home and industrial circuit breaker installations.

SUMMARY OF THE INVENTION

With an awareness of the aforementioned disadvantages of the prior art, it is an object of the present invention to provide an improved means for detecting a current imbalance between a plurality of electrical conductors.

A principal object of the invention is to provide a more economical ground fault detector having improved efficiency and reliability along with reduced physical size.

Briefly, these objects are attained by employing a magnetic amplifier with a relatively high frequency carrier for sensing a current imbalance in the supply line conductors from an AC power source. The magnetic amplifier comprises a suitable core configuration upon which a plurality of gate windings are arranged to form a balanced inductance bridge. Core size is minimized and gain is enhanced by connecting an oscillator across the bridge which provides a carrier signal at a frequency substantially higher than the frequency of the AC source. Each of the supply line conductors pass through two portions of the magnetic amplifier core so as to provide control windings on both core portions having a minimum of one turn each. The sense of the control windings is arranged to provide a net magnetic flux of approximately zero when equal currents are flowing through the conductors. In operation, a null signal is provided at the bridge output when the same current flows through each of the supply line conductors, and upon the occurrence of a current unbalance in the conductors, the unbalanced currents through the control windings modulate the higher frequency carrier signal of the gate windings to provide a modulated error signal voltage at the output terminals of the bridge. According to one embodiment the bridge output signal is then peak detected, by means of a voltage doubler and filter arrangement, and amplified to control the solenoid of a circuit breaker. The peculiar output waveform of the error signal and the use of the peak detector particularly contributes to improved cancellation of voltage transients and substantially improved reliability of operation.

BRIEF DESCRIPTION OF THE DRAWINGS

This invention will be more fully described hereinafter in conjunction with the accompanying drawings, in which.

DESCRIPTION OF PREFERRED EMBODIMENT

Figure 1:
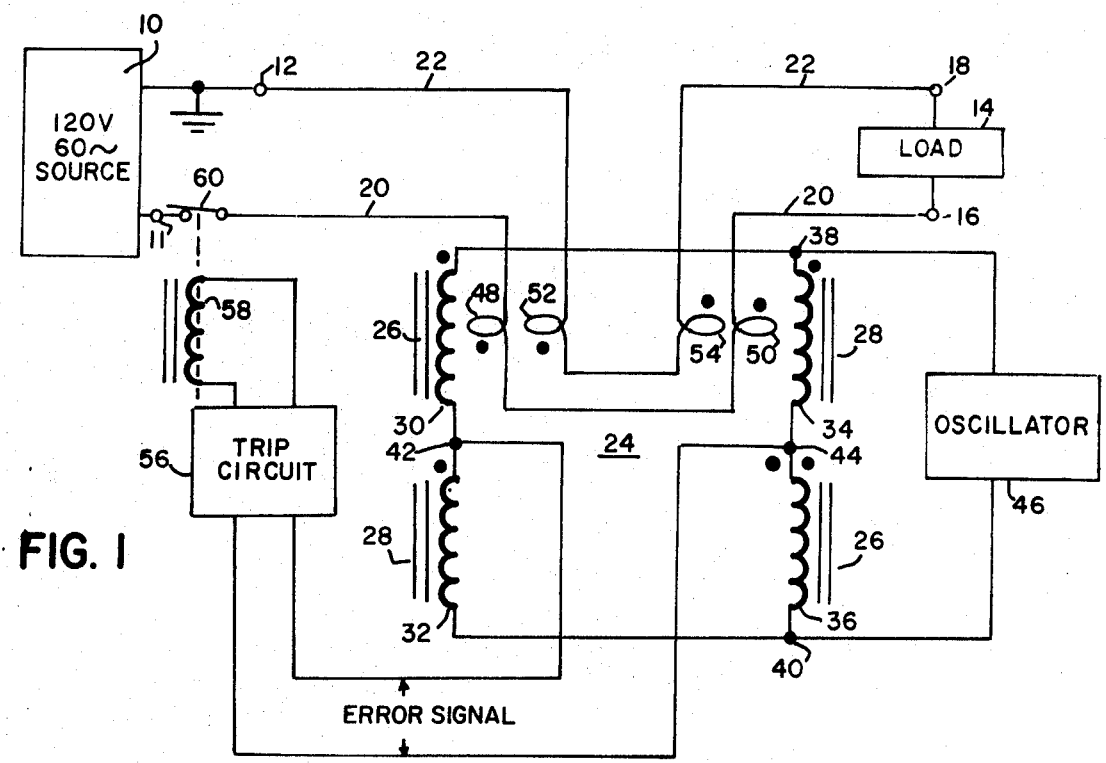
FIG. 1 is a schematic diagram of one embodiment of the invention as incorporated in a low voltage distribution circuit.

FIG. 1 shows one embodiment of the invention as employed in a distribution circuit for providing ground fault detection and responsive circuit interruption. The distribution system can be a single or a polyphase circuit, and it may consist of 2, 3 or 4 wires, provided the system is of the type in which one conductor is intentionally grounded at the power source. For example, in FIG. 1, a conventional 60 Hz., 120 volt, two-wire distribution system is shown for supplying power from an AC source 10 to a low voltage utilization circuit, represented by the load 14 connected across output terminals 16 and 18. Supply conductor 20, which is the "hot" side of the line, is connected between an input terminal 11 and output terminal 16, while the neutral conductor 22, indicated as being grounded near its source, is connected between an input terminal 12 and output terminal 18.

Under normal operating conditions, the current flow through conductors 20 and 22 is equal in magnitude, typically less than 15 amperes in a house circuit, and opposite in polarity. If any abnormal leakage current to ground occurs in the load, the current through one of the conductors will be reduced by the amount of leakage to ground, and the current flow through the leads will become unbalanced. Accordingly, the ground fault detector is employed to monitor conductors 20 and 22 and sense any current imbalance therebetween. In accordance with the present invention, this sensing function is provided by a magnetic amplifier 24 comprising a pair of matched saturable reactor cores 26 and 28 upon which are wound four identical gate windings 30, 32, 34 and 36 arranged to form a balanced inductance bridge. The reactor cores are formed of magnetically permeable material and may take any of a variety of shapes or constructions, provided the magnetic structure is closed. For example, the core implementation may comprise a pair of toroids, although a more economical and practical construction would employ stamped EI or DU shaped laminations.

The inductance bridge includes a pair of input terminals 38 and 40 and a pair of output terminals 42 and 44. Each of the gate windings has the same number of turns, with windings 30 and 36 being wound on core 26 and windings 32 and 34 being wound on core 28.

Preferably, each pair of gate windings on a core are bifilarly wound. Windings 30 and 32 are serially connected in the same sense across terminals 38 and 40, so as to be series aiding as illustrated, and windings 34 and 36 are also series connected with the same winding sense across the bridge input terminals. As illustrated, the bridge output terminals 42 and 44 comprise the junctions of the respective series connected gate windings.

The inductance bridge is driven by a low voltage carrier signal (e.g., 10 volts) provided by an oscillator 46 connected across the bridge input terminals 38 and 40. Bu virtue of the described balanced bridge arrangement of the windings, however, the carrier signal currents flowing through each branch of the bridge will be equal, and there will be no voltage difference across the bridge output terminals 42 and 44. In practice, of course, there will usually be some small differential voltage due to imperfections in the windings or differences in the exciting current requirements of the two cores. This unwanted null voltage can be cancelled out by appropriate circuitry, as will be described hereinafter.

The two supply line conductors are then passed through both reactor cores as control windings to enable monitoring of the current flowing therethrough. More specifically, the ungrounded conductor 20 provides a control winding 48 on core 26 and a control winding 50 on core 28, and neutral conductor 22 provides a control winding 52 on core 26 and a control winding 54 on core 28. Each of the control windings are identical, having one or more turns, and the sense of each of the control windings is arranged as illustrated so that when the same current flows through each of the conductors 20 and 22 the total magnetomotive force produced in the reactor cores is balanced out so that the net magnetic flux in the core combination is approximately zero.

Oscillator 46 is designed to generate a carrier frequency which is substantially higher than the 60 Hz. line frequency of the AC source but not so high as to cause undesirable noise radiation. For example, a convenient frequency selected from the range of 400 Hz. to 2500 Hz. can be quite suitable. By thus using a carrier frequency which is many times greater than the 60 Hz. line current frequency, a greater voltage may be applied to the magnetic amplifier before driving the core into AC saturation. Thus, a significantly higher error signal voltage may be provided at the bridge output terminals 42 and 44 for a given core size than would be obtainable from a 60 Hz. differential transformer. This result follows from the relationships expressed in the fundamental transformer equation:

$$E = 4.44 \, NBAf \, (10^{-8})$$

where, $E$ is the input voltage; $N$ is the number of primary turns; $B$ is the maximum flux density; $A$ is the cross-sectional area of the core in square inches; and $f$ is the frequency.

Accordingly, use of a relatively high carrier frequency in accordance with the present invention permits a significant reduction in core size, while enabling a relatively large voltage to be sustained. In this manner, the magnetic structure of the present device may be made much smaller and more compact, and one or more stages of gain may be eliminated from output utilization circuitry.

Under normal operating conditions of the distribution system including load 14, the currents flowing through conductors 20 and 22 are equal so that the magnetic amplifier 24 provides a null, or approximately zero, voltage signal across the bridge output terminals 42 and 44.

If, however, some small portion of the main load current is "leaked" to ground via a separate path other than the prescribed circuit loop, such as due to a breakdown in insulation or by accidental flow through the body of a person, the current in one of the supply lines will be correspondingly reduced so that there are unequal, or unbalanced, currents flowing through the monitored conductors 20 and 22. Because of the winding sense of the control windings 48–54, this current imbalance will cause either reactor core 26 or core 28 to be driven toward saturation. Since the control signal (load) current is at 60 Hz. and the gate current is at a much higher frequency, say 400 Hz., the net magnetomotive forces generated will tend to add at the same point in time in either core 26 or core 28.

If both the 400 Hz. gate frequency and the 60 Hz. control frequency happen to be sinusoidal, reactor core 26 will be driven hard into saturation at the moment the 60 Hz. and 400 Hz. currents add vectorially. At some later time, core 28 will be driven into saturation by a similar vectorial combination of currents. During the period that core 26 is driven into saturation, gate windings 30 and 36 will not be able to support as much voltage from the source (oscillator 46), and there will be a relatively large peak voltage generated across the bridge output terminals 42 and 44. Later in the cycle, when the other saturable reactor 28 is driven into saturation, gate windings 32 and 34 will be unable to support the same amount of voltage, and a large peak voltage will occur 180° out of the phase with the peak voltage generated when core 26 was driven into saturation. Hence, the unbalanced 60 Hz. currents through the control windings function as a modulating signal on the 400 Hz. carrier to provide at the bridge output terminals 42 and 44 a modulated error signal having large peak voltages corresponding to the simultaneous peaks of the 400 Hz. and 60 Hz. currents.

In the embodiment of FIG. 1, the error signal from magnetic amplifier 24 is applied to a trip circuit 56, which is responsive to an error signal voltage of sufficient magnitude to energize a solenoid 58 and thereby actuate a circuit breaker switch 60, which is series connected in the current path of conductor 20. Breaker switch 60 is normally closed; hence, when actuated, it interrupts the current path through the ungrounded conductor 20 and thereby disconnects load 14 from the AC power source 10.

Figure 2:
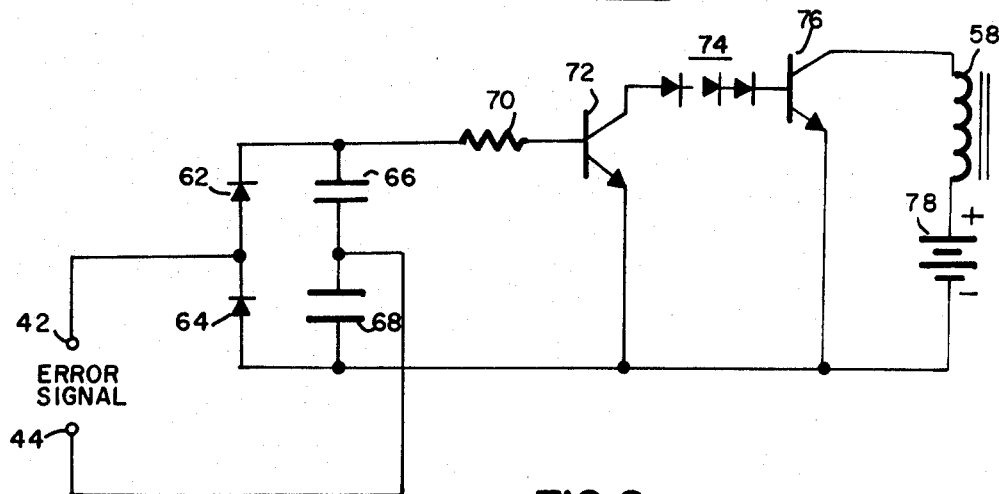
FIG. 2 is a circuit diagram of the trip circuit useful in the embodiment of FIG. 1.

A specific embodiment of a suitable trip circuit is shown in FIG. 2. The bridge output terminals 42 and 44 are connected in the usual manner, as shown, to a high impedance voltage doubler comprising diodes 62 and 64 and capacitors 66 and 68. The output of the doubler is then coupled through a current limiting resistor 70 to the base of a transistor 72, which is connected as a common emitter amplifier. The collector output of amplifier 72 is then connected through a series string of diodes 74 to the base input of a second common emitter amplifier transistor 76 having the solenoid 58 and a source of DC voltage 78 connected across its collector and emitter electrodes. More specifically, solenoid 58 is connected between the collector of transistor 76 and the positive terminal of DC source 78, while the negative terminal of the DC source 78 is connected to to the emitters of both transistors and the low side of the doubler.

In operation, doubler circuit 62–68 functions as a peak detector, with the capacitors also providing a degree of filtering, and diodes 74 provide a null threshold voltage drop whereby the circuit will tolerate a predetermined amount of null voltage error without energizing solenoid 58. Hence, during normal conditions, when the currents flowing through conductors 20 and 22 are equal and balanced, the bridge output terminals 42 and 44 will produce a null signal, which is theoretically a zero voltage, but in practice, due to minor differences in the cores and windings, will normally be a small voltage ripple. Although the null voltage ripple may be detected by doubler 62–68 and amplified by transistor 72, the null threshold diodes 74 will block the output of transistor 72 and thus prevent transistor 76 from being "turned on". As amplifier transistor 76 is normally nonconducting, solenoid 58 will not be energized, and breaker switch 60 will remain closed.

Upon the occurrence of a current imbalance between conductors 20 and 22 (indicating a ground fault), however, the magnetic amplifier 24 will generate a modulated error signal characterized by large peak voltages. These large voltage peaks are readily detected by the voltage doubler 62–68 and applied to drive amplifier 72 and overcome the threshold voltage drop of diodes 74 to drive amplifier transistors 76 into conduction. The current path thereby completed through transistor 76 connects DC source 78 across solenoid 58, thereby energizing it to actuate breaker switch 60. In this manner, the load 14 is promptly disconnected from the AC source 10 upon the occurrence of a hazardous ground fault condition.

The use of a magnetic amplifier and peak detecting trip circuit to provide ground fault detection, as illustrated in FIGS. 1 and 2, provides a number of significant advantages in addition to aforementioned features of increased gain with reduced core size. The peculiar error signal waveform, comprising the described large voltage peaks, allows the peak detection amplitude to be four or five times greater than the absolute error voltage signal; i.e., a high signal-to-noise ratio can be achieved. The circuit is also particularly suited to improved cancellation of high frequency transient voltages. Firstly, due to the bridge configuration of the gate windings 30–36, high frequency transients (e.g., above 10KHz.) will not be coupled as easily to the bridge center terminals 42 and 44 and will tend to be cancelled out. Secondly, the capacitors of the peak detection circuit (voltage doubler 62–68) function as a low pass filter and high pass shunt, whereby the high frequency transients will be shunted to ground before reaching the amplifier stages. The overall result of these features is an improved null to output gain, whereby the circuit may be more amplitude selective, and a significantly enhanced reliability of operation.

In the form of the invention shown in FIGS. 1 and 2, the following components and values were employed and were found to produce satisfactory results. Of course, other values may be chosen for particular design considerations:

| Component No. | Value or Description |
| --- | --- |
| 58, 60 | Heinemann circuit breaker 0JA1-B6, 15 amp contacts |
| 30, 32, 34, 36 | 500 turns of 034 wire each. |
| 48, 50, 52, 54 | 5 turns of 014 wire each. |
| 46 | Royer type oscillator, 400 Hz., 10 volts. |
| 62, 64 | diodes type 1N4002 |
| 66, 68 | capacitors each 0.1 microfarads, 200 volts. |
| 70 | 10 ohms, ¼ watt |
| 72, 76 | transistor type 2N5322 |
| 74 | diodes type 1N4002 |
| 78 | 15 volts DC |

The circuit was operative to trip the circuit breaker within 25 milliseconds in response to a leakage current from line to ground of 5 milliamps or greater.

Although the invention has been described with respect to a specific embodiment, it will be appreciated that modifications and changes may be made by those skilled in the art without departing from the true spirit and scope of the invention. For example, as previously mentioned, a variety of core structures are applicable, including toroidal, and EI or DU laminations. Further, the error signal may be supplied to other loads for various type applications; e.g., a triac, a rectifier, a silicon controlled rectifier, or a small indicator lamp. Also, the device is clearly not limited to ground fault detection, but may be employed in a variety of applications requiring the detection of a current imbalance between a plurality of conductors.

What we claim is:

1. Means for detecting a current imbalance between a plurality of electrical conductors having respective input terminals for connection to a source of AC power and respective output terminals for connection to a load, said detecting means comprising, in combination, core means of magnetically permeable material, a plurality of windings on said core means arranged to form a balanced inductance bridge, each of said conductors passing through two portions of said core means so as to provide control windings on both of said core portions, the sense of each of said control windings being arranged so that when the same current flows through each of said conductors the total magnetomotive force produced in said core means is balanced out so that the net magnetic flux in the core means is approximately zero, said balanced inductance bridge having a pair of input terminals and a pair of output terminals, and an oscillator connected across the input terminals of said bridge, said oscillator having a frequency of operation substantially higher than the frequency of said AC source, and said detecting means being operative to provide at said bridge output terminals a null signal when the same current flows through each of said conductors and an error signal voltage in the presence of a current imbalance between said conductors.

2. Detecting means according to claim 1 further including means coupled to the output terminals of said bridge for responding to a predetermined voltage thereacross and thereby indicating a current imbalance between said conductors.

3. Detecting means according to claim 1 wherein said core means forms two saturable reactor cores, and each of said conductors provides control windings on both of said reactor cores.

4. Detecting means according to claim 3 wherein said core means, said bridge windings and said control windings comprise a magnetic amplifier, said bridge windings are the gate windings of said magnetic amplifier, and in the presence of a current imbalance between said conductors the output of said oscillator functions as a carrier and the unbalanced currents through said control windings function as a modulating signal to provide a modulated error signal voltage at the output terminals of said bridge.

5. Detecting means according to claim 4 further including a voltage peak detector coupled to the output terminals of said bridge.

6. Detecting means according to claim 4 wherein the windings forming said inductance bridge comprise first, second, third and fourth gate windings each having approximately the same number of turns, said first and fourth gate windings are wound on one of said reactor cores, said second and third gate windings are wound on the other of said reactor cores, said first and second gate windings are serially connected in the same sense across said bridge input terminals, said third and fourth gate windings are serially connected in the same sense across said bridge input terminals, and said bridge output terminals comprise the junction of said first and second gate windings and the junction of said third and fourth gate windings.

7. The combination of claim 1 wherein said detecting means comprises a ground fault detector, one of said conductors is adapted to be grounded at said AC power source, and said ground fault detector is operative to provide an error signal voltage at said bridge output terminals in response to an abnormal leakage current to ground from one of said conductors.

8. The ground fault detector of claim 7 wherein said core means comprises a pair of saturable reactor cores, and each of said conductors provides control windings on both of said reactor cores.

9. The ground fault detector of claim 8 further including current interrupting-means coupled to the output terminals of said bridge for disconnecting said load from said source of AC power in response to an error signal voltage at said bridge output terminals.

10. The ground fault detector of claim 9 wherein said current interrupting means comprises a voltage peak detector coupled to said bridge output terminals, a solenoid coupled to the output of said peak detector, and a circuit breaker switch connected in an ungrounded one of said conductors and adapted to be actuated by said solenoid.

11. The ground fault detector of claim 10 wherein said peak detector comprises a voltage doubler and filter, and said interrupting means further includes an amplifier coupled between said doubler-filter and said solenoid.

12. The ground fault detector of claim 11 wherein said reactor cores, said bridge windings and said control windings comprise a magnetic amplifier, the windings forming said inductance bridge comprise, first, second, third and fourth gate windings each having approximately the same number of turns, said first and fourth gate windings are wound on one of said reactor cores, said second and third gate windings are wound on the other of said reactor cores, said first and second gate windings are serially connected in the same sense across said bridge input terminals, said third and fourth gate windings are serially connected in the same sense across said bridge input terminals, said bridge output terminals comprise the junction of said first and second gate windings and the junction of said third and fourth gate windings, and in the presence of a current imbalance between said conductors the output of said oscillator functions as a carrier and the unbalanced currents through said control windings function as a modulating signal to provide a modulated voltage error signal at the output terminals of said bridge.

13. The ground fault detector of claim 7 wherein said AC power source has a frequency of approximately 60 hertz and said oscillator has an operating frequency selected from a range of 400 hertz to 2500 hertz.

* * * * *